United States Patent [19]

Gerber

[11] Patent Number: 4,754,183

[45] Date of Patent: Jun. 28, 1988

[54] STEPPING OR REVERSIBLE MOTOR

[75] Inventor: Hermann Gerber, Biel, Switzerland

[73] Assignee: SAIA AG, Murten, Switzerland

[21] Appl. No.: 937,377

[22] Filed: Dec. 3, 1986

[30] Foreign Application Priority Data

Dec. 10, 1985 [CH] Switzerland .......................... 5268/85

[51] Int. Cl.$^4$ ........................................... H02K 21/12
[52] U.S. Cl. ..................................... 310/156; 310/43;
310/49 R; 310/89; 310/112; 310/180; 310/254
[58] Field of Search ..................... 310/49 R, 179, 266,
310/180, 67 R, 184, 162–164, 261, 254, 112,
156, 89, 90, 43, 44, 208

[56] References Cited

U.S. PATENT DOCUMENTS

| | | | |
|---|---|---|---|
| 3,508,091 | 4/1970 | Kavanaugh | 310/164 |
| 3,751,696 | 8/1973 | Morreale | 310/49 R |
| 3,777,196 | 12/1973 | Field, II | 310/49 R |
| 4,501,980 | 2/1985 | Welburn | 310/266 |
| 4,532,448 | 7/1985 | Welburn | 310/266 |

FOREIGN PATENT DOCUMENTS

| | | | |
|---|---|---|---|
| 2820308 | 11/1979 | Fed. Rep. of Germany | 310/266 |
| 3119733 | 12/1982 | Fed. Rep. of Germany | 310/49 R |
| 0426012 | 6/1967 | Switzerland | 310/49 R UX |
| 0126394 | 4/1959 | U.S.S.R. | 310/49 R |

OTHER PUBLICATIONS

IBM Tech. Discl. Bulletin, Control of Electromagnet Stepping Motor, H. D. Chai, vol. 15, No. 3, 8/1972.

Primary Examiner—R. Skudy
Attorney, Agent, or Firm—Marks Murase & White

[57] ABSTRACT

A rotor of T-shaped section lies on the motor shaft. The rotor comprises two external symmetrical collars which comprise radial magnetized permanent magnetic poles. Two identical stator parts, symmetrically arranged in the motor comprise external pole teeth lying external resp. internal of each of one of the collars of the motor. This gives rise to a radial flow of magnetic flux in the external lying, radially magnetized permanent magnetic poles of the rotor which leads to a high torque and efficiency. The construction of the motor is simple. Relatively thin material may be used. Relatively high number of poles are possible due to the fact that the effective poles, of the stator and of the rotor lie at the outside.

17 Claims, 1 Drawing Sheet

U.S. Patent     Jun. 28, 1988     4,754,183
FIG. 1
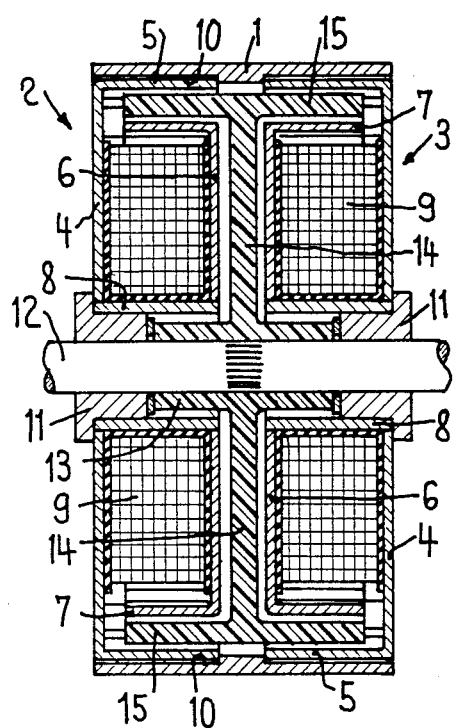
FIG. 2
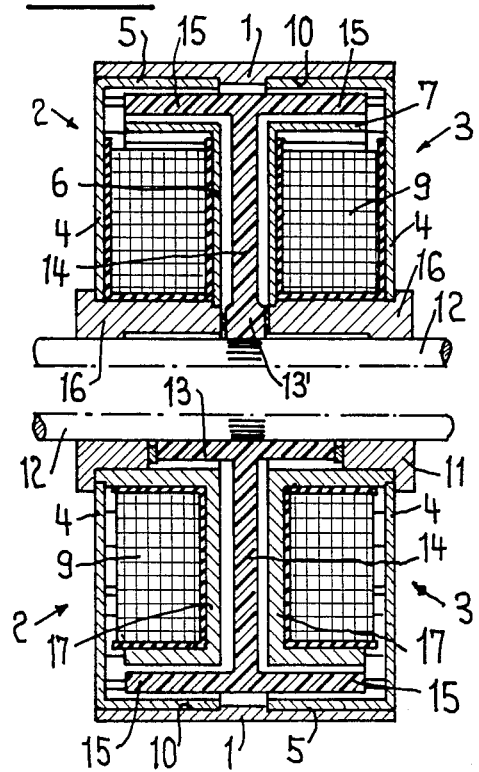
FIG. 4
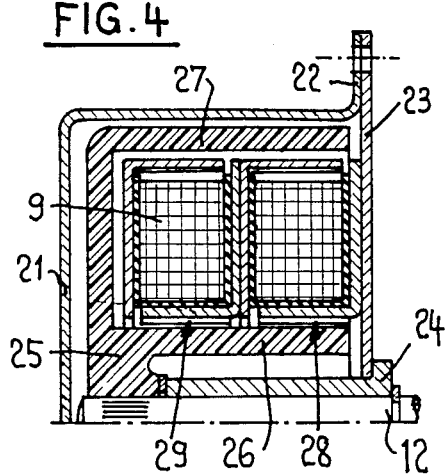
FIG. 3
FIG. 5
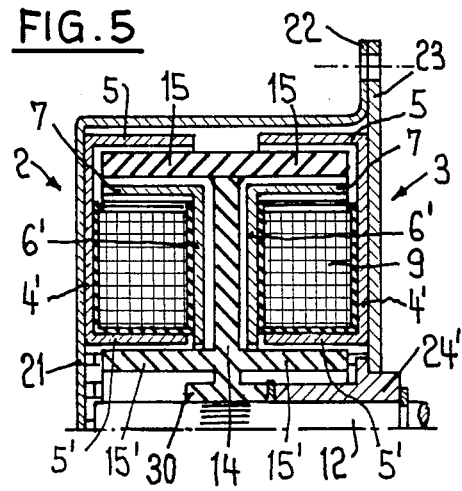

STEPPING OR REVERSIBLE MOTOR

BACKGROUND OF THE INVENTION

The present invention relates to a stepping or reversible motor with two separately excitable stator parts, each of which comprising at the external periphery polar teeth of alternate polarity, a ring or cylinder-shaped permanent magnetic rotor engaging between radial external and internal polar teeth. Such a motor is known from CH426 012. This known motor comprises two basically different stator parts having different dimensions which leads to a relatively expensive production. As for the rest, it would be difficult to achieve in all cases same characteristics, more particularly starting conditions independently of what stator part is fed through a capacitor with a phase shifted current.

SUMMARY OF THE INVENTION

It is the object of the present invention to achieve by means of a complete symmetry of the motor not only a simplification of the fabrication but also an improvement of the characteristics. To solve this problem, the motor according to the invention is symmetrically formed with T-shaped rotor or bell-shaped rotor of which radial magnetized permanent magnetic collars engage between radially staggered polar teeth of stator parts of the same kind arranged on both sides of the rotor such that each collar of the rotor is in a radially effective polar field. The particular characteristics and advantages of the solution according to the invention will be explained in more details by means of a few examples of execution illustrated in the drawings.

BRIEF DESCRIPTION OF THE DRAWINGS

FIG. 1 shows an axial section through a first embodiment of the invention

FIG. 2 shows a half axial section through a second embodiment of the invention;

FIG. 3 shows a half axial section through a third embodiment of the invention;

FIG. 4 shows a half axial section through a fourth embodiment of the invention; and FIG. 5 shows a half axial section through a fifth embodiment of the invention.

DETAILED DESCRIPTION OF THE INVENTION

The stepping or reversible motor illustrated in FIG. 1 comprises a cylindrical casing 1 made of material having poor magnetic conductivity, e.g. aluminium or synthetic material. Symmetrically arranged stator parts of identical construction are inserted in this casing 1 where they fit closely. Each stator part comprises an external disk 4 with external polar teeth 5 and an internal disk 6 with internal polar teeth 7. Each of the disks 4 and 6 of each stator part are forced by pressure on a tube 8 of soft iron. Each tube 8 extends through a coil 9 which can be fed in a known manner with alternating current or with pulses of current from an electronic circuit. The supply of current may be accomplished through a capacitor or from an electronic circuit with an appropriate phase shift in order to drive the motor clockwise or counterclockwise. The polar teeth of both stator parts 2 and 3 in the casing 1 are staggered along the periphery of the respective disks 4 and 6 in correspondence with the electrical phase shift. The external stator teeth 5 engage in flat grooves 10 which are embossed or formed in the internal side of the casing 1. In this way, the stator parts are oriented in their correct position in casing 1 without any other necessary structure.

A bearing 11 is set in both stator parts 2 and 3 and the rotor shaft 12 is supported in these bearings. It bears a rotor with a hub 13 of a disk 14 fastened on the rotor shaft 12 and two symmetric axial collars 15. This produces a rotor having a T-shaped section. The collars 15 of the rotor are positioned between the external and internal polar teeth 5 and 7 so that they are radially traversed by the flux of the stator. The rotor is in one piece of magnetizable material, e.g. magnetizable plastic, and its collars 15 comprise permanent magnetized poles. The material comprises preferably a radial anisotropy in the domain of the collars 15 and the permanent magnetic poles can be radially magnetized.

This gives rise not only to a rational and simple fabrication in that two identical stator parts 2 and 3 can be used and in that the collars 15 of the rotor can be radially magnetized in a simple manner but also to a motor having particularly advantageous characteristics. The radially directed magnetic flux traversing the collars 15 of the rotor and the relatively great diameter thereof gives rise to high torques. The great diameter of the effective part of the rotor and of the stator air gaps permits also an execution of the motor with a relatively high number of poles, e.g. up to hundred poles. Material of relatively small thickness may be used with any loss of torque and power.

FIG. 2 shows a form of execution in which corresponding parts bear the same reference numerals as in FIG. 1. The essential difference is that instead of the tube 8 of soft iron, bushings 16 of sintered iron are provided which are used at the same time as bearing bushings for the rotor shaft 12. The disks 4 and 6 are forced by pressure on these bushings 16. The hub 13' of the rotor is axially shorter than the hub 13 of FIG. 1.

FIG. 3 shows a further form of execution in which as before, corresponding parts bear the same reference numerals as in FIG. 1. The principal difference is that each of the stator parts 2 and 3 consists of an internal pole ring 17 of sintered iron with a C-shaped section and of the external disk 4 of L-shaped section. The disks 4 are forced with pressure on a shoulder at the external edge of the internal tube-shaped part of the pole rings 17. This gives rise to a certain simplification because each of the stator parts consists of only two iron parts.

FIG. 4 shows a form of execution which is essentially different from the other forms described above. The housing consists of a deep-drawn casing 21 the flange 22 of which is connected with a flat housing part 23. A bearing bushing 24 is fastened the housing wall 23 and supports the rotor shaft 12. On the rotor shaft 12 is mounted a rotor 25 consisting of one piece of a permanent magnetizable material, e.g. of magnetizable plastic which comprises an internal axial collar 26 as well as an external axial collar 27. An external stator part 28 and an internal stator part 29 are directly connected together and the external stator part 28 is connected with the housing wall 23. Both stator parts 28 and 29 project flying from the housing wall 23 in the space between the axial collars 26 and 27 of the rotor. The coil shells, coils and pole rings of the stator parts 28 and 29 are all directly connected together, e.g. glued, the pole rings being glued together over the coil shells so that the whole unit is self-supporting. The stator parts 28 and 29 comprise internal and external rings of alternate opposite polarized pole teeth each of which being arranged opposite to one of the collars 26 and 27 of the rotor. This produces also a motor of simple construction which may be rationally produced and which comprises a particularly high torque.

FIG. 5 shows an embodiment having a housing 23 which corresponds to the housing 23 in the embodiment of FIG. 4. Like reference numerals are used to indicate like parts. In the embodiment of FIG. 5, the bearing bushing 24' is fastened to the housing wall 23. The stator parts 2 and 3 are fastened to the front walls of the housing 23. The deep-drawn pole rings 4' and 6' of each stator part comprise also at the inside pole teeth 5' each of which lies opoosite to an internal collar 15' with permanent magnetic poles of the rotor. The pole rings 4' and 6' of stator parts 2 and 3, respectively, connected together by means of the coil shells in a predetermined opposite position. The rotor according to FIG. 5 comprises a hub 30 which is integrally formed with the disk 14 of the rotor. In this case, the external permanent magnetized part of the rotor is in the form of a sleeve connected with the disk 14. The sleeve may be glued to the disk 14 or connected by other suitable means.

Embodiments other than those described hereinabove may be practiced in accordance with the invention. For example, the disk 14 of the rotor may not be full but it could be provided with recesses or also with spokes. It would also be possible to bring the number of spokes in a determined relation to the number of poles of the motor. The permanent magnetizable material in such an embodiment could be magnetized correspondingly in order to achieve an additional torque on the disk 14 of the rotor. The disks 6 could be divided in poles corresponding to the pole rings of the stator. Instead of the connection of both pole rings each of a stator part through meshing indentation according to FIG. 5, the internal tube-shaped flanges could also comprise different diameters and mesh with overlapping. A combination of the execution of FIG. 4 with any of the other executions is also possible in the sense that the stator parts enclose outer collars 15 of the rotor and cause a radial flow of the magnetic flux through these collars of the rotor and that in accordance with FIG. 4, the stator parts comprise also internal pole teeth. It is also possible to eliminate the displacement of the pole teeth of both stator parts in the peripheral direction in correspondence to the electrical phase shift and to displace instead correspondingly the permanent magnetic poles of both collars 15 of the rotor in the peripheral direction. This could contribute to a simplification in the case where the external stator teeth 5 are oriented in the grooves 10 of the casing 1. When the stator parts are disposed with pole teeth mutually displaced in the peripheral direction, it is possible to eliminate the orienting grooves 10 in the casing and the stator parts should then be held e.g. by close fitting in the casing. The stranded wires of connection for the coils 9 are not represented in the Figures for the sake of simplicity. They may be arranged in slots in the stator and in recesses of the housing. Possible spokes of the rotor may have an S-shaped form in order to accommodate or avoid tensions.

I claim:

1. An electric motor comprising:
   a shaft;
   first and second separately excitable stator parts arranged coaxially about said shaft, each comprising a first plurality of pole teeth having a first polarity and a second plurality of pole teeth having a second polarity different from said first polarity, said stator parts being of substantially identical construction; and
   a rotor body mounted on said shaft coaxially with said stator parts, said rotor body being made of a permanently magnetizable material, and having at least two integrally-formed, axially-extending, magnetically anisotropic collars with permanent magnetic poles, said poles being arranged to face said pole teeth.

2. A motor according to claim 1, wherein the stator parts are substantially concentric with said shaft, and wherein said first and second pluralities of pole teeth are disposed at equal radial lengths, respectively, from said shaft; and
   wherein said permanent magnetic poles of said collars are radially anisotropically magnetized.

3. A motor according to claim 1, wherein said pole teeth of said first and second separately excitable stator parts are peripherally staggered; and
   wherein said permanent magnetic poles are axially disposed at equal radial lengths from said shaft.

4. A motor according to claim 1, wherein said first and second separately excitable stator parts each comprise:
   a coil means for electromagnetically exciting said stator part; and
   a first and second disk each having a ring of said first and second pole teeth;
   wherein each disk is connected with a tube of sintered iron which traverses said coil.

5. A motor according to claim 4, wherein said tube of sintered iron comprises a bearing bushing means for rotatably supporting said shaft.

6. A motor according to claim 1, wherein one of said collars is a radial external collar disposed along an external radius extending from said shaft and one of said collars is a radial internal collar disposed along an internal radius less than said external radius; and
   wherein each of said first and second separately excitable stator parts is disposed between said radial internal and radial external collars of the rotor.

7. A motor according to claim 1, wherein each separately excitable stator part comprises a pole ring of C-shaped section comprised of sintered iron and a pole ring of L-shaped section comprised of soft iron.

8. An electric motor according to claim 1, wherein said rotor body is comprised of permanently magnetizable plastic.

9. An electric motor according to claim 1, wherein said rotor body is of T-shaped cross-section and comprises a central disk having axially extending collars disposed along a periphery of said central disk;
   wherein each of said stator parts have radially staggered external and internal pole teeth; and
   wherein each of said collars of said rotor body is engaged between said radially staggered internal and external pole teeth, said collars having a radial magnetic anistropy and having radially magnetized permanent poles.

10. An electric motor according to claim 1, wherein said rotor body is bell-shaped and comprises an inner collar disposed along a first radius of said rotor body and an outer collar disposed along a second radius of said rotor body greater than said first radius, said inner and outer collars having permanent magnetic poles formed thereon; and wherein said stator parts having inner pole teeth adjacent to said inner collar and outer pole teeth adjacent to said outer collar.

11. An electric motor according to claim 1, further comprising a casing means for accommodating said motor, wherein said casing means is provided with groove means for accommodating and orienting said pole teeth.

12. A motor according to claim 6, wherein said first and second pluralities of pole teeth are each comprised of a first and second set of pole teeth;
said first set of pole teeth lying along a first radius less than said external radius and greater than said internal radius, and said second set of pole teeth lying along a second radius greater than said internal radius and less than said first radius;
wherein said first and second separately excitable stator parts each further comprise coil means for electrically exciting said first and second pluralities of pole teeth.

13. An electric motor comprising:
a rotatable shaft;
a permanently magnetized integrally formed rotor rotatably coupled to said shaft and comprising a substantially planar disk portion substantially concentric with said shaft, and first and second axially extending collars symmetrically disposed along a periphery of said disk portion;
first and second stator parts disposed adjacent opposite faces of said planar disk, each of said stator parts comprising:
a first disk member having axially extending pole teeth disposed adjacent an outer periphery of said first collar; and
a second disk member having axially extending pole teeth disposed adjacent an inner periphery of said second collar.

14. An electric motor according to claim 13, wherein said said rotor is radially anisotropically magnetized.

15. An electric motor according to claim 13, wherein said rotor comprises a radial anisotropy in the area of said first and second collars.

16. An electric motor according to claim 13, wherein said rotor is comprised of permanently magnetized plastic.

17. An electric motor according to claim 13, wherein each stator part further comprises a coil means, disposed between said first and second disk members, for electromagnetically exciting each of said stator parts.

* * * * *